United States Patent
Fleming

(10) Patent No.: US 8,912,698 B2
(45) Date of Patent: Dec. 16, 2014

(54) MOTOR ASSEMBLY WITH INTEGRATED COOLING MEANS AND ENCLOSED COMPARTMENT FOR ELECTRONIC CIRCUITRY

(75) Inventor: Joseph W. Fleming, Ramsey, NJ (US)

(73) Assignee: Elco Motor Yachts, LLC, Shelton, CT (US)

( * ) Notice: Subject to any disclaimer, the term of this patent is extended or adjusted under 35 U.S.C. 154(b) by 484 days.

(21) Appl. No.: 13/251,832

(22) Filed: Oct. 3, 2011

(65) Prior Publication Data

US 2013/0082550 A1 Apr. 4, 2013

(51) Int. Cl.
*H02K 5/00* (2006.01)

(52) U.S. Cl.
USPC .......................................... 310/89

(58) Field of Classification Search
USPC ..................................... 310/89, 87
IPC ....................... H02K 5/10,9/06, 5/04
See application file for complete search history.

(56) References Cited

U.S. PATENT DOCUMENTS

| | | |
|---|---|---|
| 1,725,667 A | 8/1929 | Muller |
| 2,473,105 A | 6/1949 | Luenberger |
| 2,482,491 A | 9/1949 | Kilgore |
| 2,778,958 A | 1/1957 | Hamm et al. |
| 3,461,328 A | 8/1969 | Drouard |
| 3,501,660 A | 3/1970 | Wightman et al. |
| 3,518,467 A | 6/1970 | Wightman |
| 4,033,531 A | 7/1977 | Levine |
| 4,742,257 A | 5/1988 | Carpenter |
| 4,908,538 A | 3/1990 | Geberth, Jr. |
| 5,592,038 A | 1/1997 | Gaspar et al. |
| 5,763,969 A | 6/1998 | Metheny et al. |
| 5,789,833 A | 8/1998 | Kinoshita et al. |
| 5,925,947 A | 7/1999 | Kajiwara et al. |
| 6,078,115 A | 6/2000 | Uchida et al. |
| 6,093,990 A | 7/2000 | Meeks et al. |
| 6,246,134 B1 | 6/2001 | Berrong et al. |
| 6,570,284 B1 * | 5/2003 | Agnes et al. ................. 310/89 |
| 6,700,237 B1 | 3/2004 | Yang |
| 6,774,514 B2 | 8/2004 | Matsuoka et al. |
| 6,891,290 B2 | 5/2005 | Nagayama et al. |
| 6,933,638 B2 | 8/2005 | Hirth |
| 7,462,964 B2 | 12/2008 | Nagayama et al. |
| 7,541,701 B2 | 6/2009 | Lin et al. |
| 7,888,830 B2 | 2/2011 | Mori |
| 7,977,832 B2 * | 7/2011 | Vadillo et al. ................. 310/62 |
| 2006/0028075 A1 | 2/2006 | Noda et al. |
| 2006/0119197 A1 * | 6/2006 | Puterbaugh et al. ............ 310/87 |
| 2007/0284954 A1 | 12/2007 | Lin et al. |

(Continued)

OTHER PUBLICATIONS

SAE International, Vehicle Electrification; 2011 Nissan Leaf Vehicle Overview, 38 pages (2011).

*Primary Examiner* — Hanh Nguyen
(74) *Attorney, Agent, or Firm* — Lerner, David, Littenberg, Krumholz & Mentlik, LLP

(57) ABSTRACT

A motor assembly includes a structural unit for mounting a motor, for mounting and enclosing electronic circuitry, and for providing a corridor for air to flow and cool the motor and/or the electronic circuitry. The motor assembly includes a substantially water-resistant motor that rotationally drives a fan for cooling the motor and/or rotationally drives a propeller for providing propulsion to watercraft. The electronic circuitry of the motor assembly receives and transmits instructions to a command post by way of electronic signals and distributes power to the motor. The structural unit seals the circuitry from the surrounding environment.

26 Claims, 9 Drawing Sheets

(56) References Cited

U.S. PATENT DOCUMENTS

| | | |
|---|---|---|
| 2008/0036314 A1 | 2/2008 | Kanei et al. |
| 2008/0143201 A1* | 6/2008 | Ramy et al. .................. 310/59 |
| 2008/0191564 A1 | 8/2008 | Piper et al. |
| 2008/0284265 A1 | 11/2008 | Chaohai et al. |
| 2009/0267432 A1* | 10/2009 | Henry et al. .................. 310/71 |
| 2009/0289513 A1* | 11/2009 | Vadillo et al. ................ 310/62 |

* cited by examiner

MOTOR ASSEMBLY WITH INTEGRATED COOLING MEANS AND ENCLOSED COMPARTMENT FOR ELECTRONIC CIRCUITRY

BACKGROUND OF THE INVENTION

The present invention relates to motor assemblies and more particularly to sealed electric motor assemblies for use in a marine environment.

Gasoline, diesel, and electric powered motors have been used as the means of propulsion for boats and other watercraft for many years. For many applications, electric motors are preferred over combustion engines, such as gasoline and diesel powered engines because they are cleaner and quieter. Electric motors are most often powered by on-board batteries that can be recharged, for example, by connection to a municipal power source or by connection with wind-based generators or solar collectors. Further, such batteries can be charged by "regenerative" means, including by collecting energy from braking, coasting, or the like. Electric motors can also have a reduced impact on the environment because they do not directly emit greenhouse-gases and do not divert fossil fuels from use in other applications. The lack of emissions by electric motors can be particularly desirable in marine applications because of the sensitivity of many marine environments.

Electric motors require electronic circuitry to control, for example, the amount of current provided to the motor, enabling the speed or torque of the motor to be adjusted based on, for example, a user's input. Both such circuitry and electric motors themselves can generate significant amounts of heat which can damage both the electronic circuitry and the motor. Thus, various cooling mechanisms have been incorporated into electric motors and their overall systems. Many motors, including combustion engines use mechanical fans attached to a rotating shaft of the motor. Motors can also use an electric fan detached from the motor. These fans can be axial fans that direct air towards the motor or radial fans that direct the air circumferentially about the axis of the fan in which a fan shroud or housing redirects the air towards the motor. Applications using radial fans often use fan housings to redirect air. When used in marine environments, totally-enclosed, fan-cooled ("TEFC") motors can be advantageous. TEFC motors are typically AC powered and, thus generate less heat than DC motors, which often require brushes. Accordingly, TEFC motors can include an outer housing that lacks vents or other air passages to the interior for cooling the internal components thereof. Rather, TEFC motors typically rely on a fan for convection cooling of the outer housing, which conducts an adequate amount of heat away from the internal motor components for sufficient cooling. The housings for TEFC motors are typically sealed around the axle or other power take-off component and around any other components that extend through the housing, such as wires or the like. Such a seal can be at least dust-tight or can be splash proof, water resistant, or water-proof, the latter of which allows the motor to be submerged in water up to a predetermined depth.

Some electric motors have the electronic control circuitry mounted within various structures that are configured for attachment onto the housing that surrounds the motor, thus using the motor itself as the support structure for these peripheral components. The motor housings must be custom-made or modified to accommodate attachment of these additional structures. Motors with such circuitry arrangements cannot be easily retrofitted or used in place of housings for current combustion engines due to the different space they utilize. Custom mountings are then be required to accommodate these circuitry arrangements which do not have a configuration that matches that of a combustion engine intended for replacement as these engines often adhere to different standards for their mounting configurations.

Therefore, there exists a need for a motor assembly that uses standard motors and fan housings that can be used in place of fuel-based motors and that provides efficient cooling reliability. There is also a need for a motor assembly that can provide a sealed environment for the associated control circuitry, allowing the assembly to take advantage of the incorporation of a TEFC motor.

BRIEF SUMMARY OF THE INVENTION

In accordance with an aspect of the invention, a motor assembly can include a motor, motor control circuitry, and a structural unit. The structural unit can include a compartment defined on one side by an interior wall. The motor control circuitry can be received in the compartment, and the compartment can be configured to enclose and seal the motor control circuitry. The cover unit can include opposing side walls that, together with the interior wall, define a motor space that is adjacent to the interior wall on an opposite side of the interior wall from the compartment. The motor can be at least partially received within the motor space.

In an embodiment, the motor can rotationally drive a driveshaft. In such an embodiment, a fan attached to the driveshaft can be configured to produce an airflow by the rotation of the driveshaft such that at least a portion of the airflow passes through the airflow corridor. In an embodiment, the motor can include a fan shroud portion that is configured to direct the airflow toward the airflow corridor.

In accordance with another aspect of the invention, a motor assembly can include an electric motor, motor control circuitry in electrical communication with the electric motor, and a structural unit. The structural unit can include a compartment defined at least by an interior wall and opposing side walls. The motor control circuitry can be received in the compartment which can enclose and seal the motor control circuitry. The motor can be mounted to the cover in a position adjacent to the interior wall and on an opposite side of the interior wall from the compartment. The structural unit can further include at least two flanges that can extend from the opposing side walls of the structural unit. The flanges can be configured to match a mounting configuration for a combustion engine.

In accordance with another aspect of the invention, a structural unit for an electric motor assembly can include a compartment defined on one side by an interior wall. The compartment can be configured to enclose and seal motor control circuitry. The structural unit can further include opposing side walls that, together with the interior wall, define a motor space adjacent to the interior wall and on an opposite side from the compartment. The motor space can be configured to at least partially receive an electric motor. The structural unit can further include at least two flanges that extend from the opposing side walls of the structural unit on a side of the opposing side walls opposite from the compartment. The at least two flanges can be configured to match a preconfigured external mounting structure.

In accordance with another aspect of the invention, a motor assembly can include a motor. The motor can include an outside surface and a driveshaft that is configured to be rotationally driven by the motor. The motor assembly can further include a structural unit. The structural unit can include an interior wall and opposing side walls that together define a motor space. The motor space can at least partially receive the motor such that a portion of the outside surface of the motor and at least the interior wall of the structural unit can define an airflow corridor. The motor assembly can further include a fan that is attached to the driveshaft of the motor. The fan can be configured to be rotationally driven by the driveshaft such that the fan produces an airflow such that least a portion of the airflow produced by the fan passes through the airflow corridor. The motor assembly can further include at least two flanges that extend from the opposing side walls of the structural unit on a side of the opposing side walls opposite from the compartment. The at least two flanges can be configured to match a preconfigured external mounting structure.

DETAILED DESCRIPTION OF THE INVENTION

Figure 1:
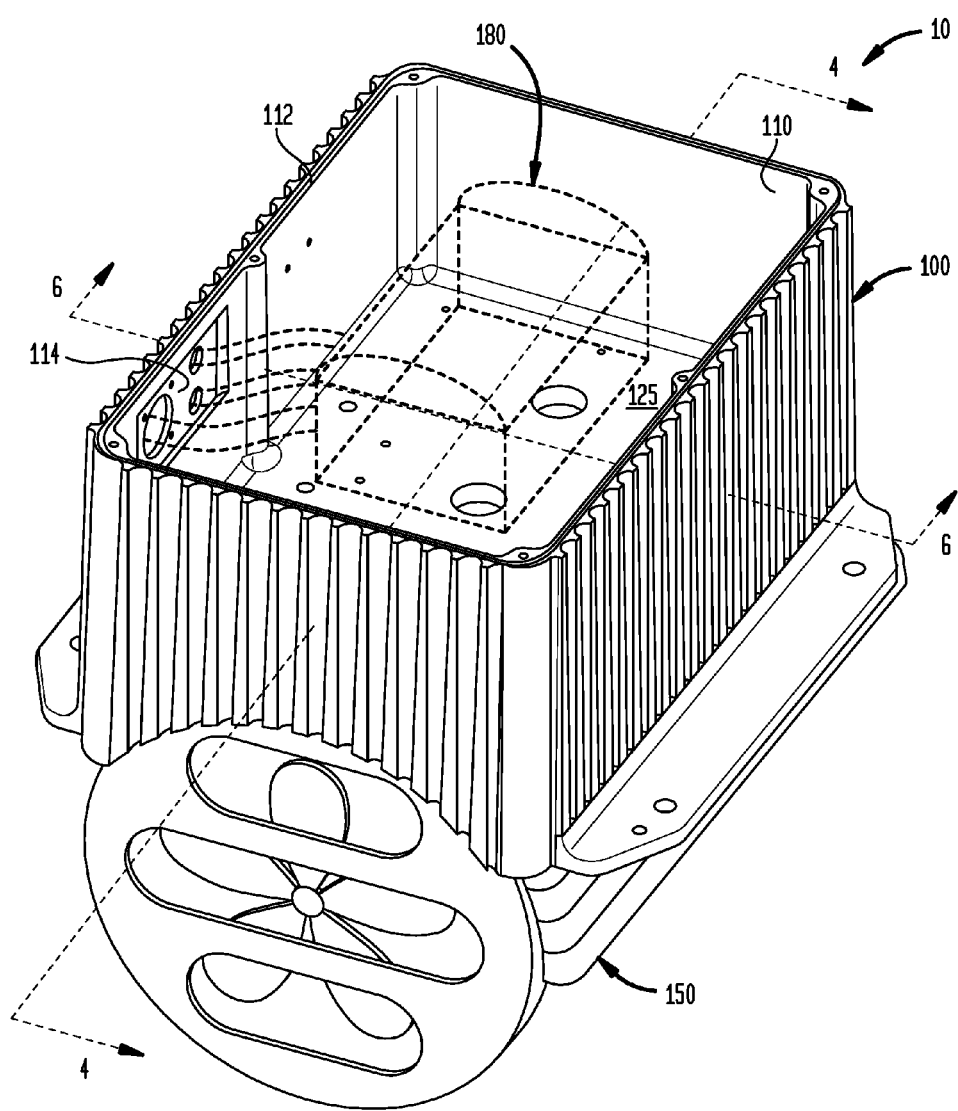
FIG. 1 is a perspective view of a motor assembly in accordance with the present invention, shown without an exterior cap.

In the Brief Summary of the Invention above and in the Detailed Description of the invention herein, and the claims below, and in the accompanying drawings, reference is made to particular features of the invention. It is to be understood that the disclosure of the invention in this specification includes all possible combinations of such particular features, whether particularly described or not. For example, where a particular feature is disclosed in the context of a particular aspect, arrangement, or embodiment of the invention, or a particular claim, that feature can also be used, to the extent possible, in combination with and/or in the context of other particular aspects, arrangements, and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can consist of not only components A, B, and C but also one or more other components. The term "step of" does not mean "step for".

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which can be a range having an upper limit or no upper limit, depending on the variable being defined). For example, "at least 1" means 1 or more than 1. The term "at most" followed by a number is used herein to denote the end of a range ending with that number (which can be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

The terms "lower," "upper," "top," "bottom," etc. and derived directional terms such as "horizontal", "vertical", "upward", and "downward" are based on a normal configuration, i.e. orientation, of the apparatus described herein as shown in the drawings. The term "water-resistant" as used herein is in accordance with the definition provided for a NEMA type 4 rating under the NEMA 250 standard or an IP65 rating under IEC 60529.

The present disclosure provides for a motor assembly for providing propulsion to marine vessels that can include substantially sealed portions providing water-resistance. The disclosure further provides for a structural unit that can be adapted for mounting a motor and/or electronic circuitry, sealing the electronic circuitry, cooling components attached to the unit through improved airflow in the interior of the unit, and mounting to boat hulls.

In accordance with aspects of the invention, the motor assembly can include i) a motor, that can be substantially water-resistant, for providing rotational force to a fan for cooling the motor and/or a propeller for providing propulsion to watercraft, ii) electronic circuitry for receiving from and transmitting to a command post instructions by way of electronic signals and for distributing power to the motor in which the circuitry can be sealed from the surrounding environment and iii) and a structural unit for mounting the motor, enclosing the electronic circuitry, and providing a corridor for air to flow and cool any of the motor or the electronic circuitry.

In accordance with other aspects of the disclosure, a structural unit, such as that just described, can include a i) substantially sealed compartment for enclosing electronic circuitry, ii) a motor space adapted for mounting a motor and covering at least portions of the motor while providing access to the motor to engage rotationally driven components such as propellers, and iii) at least one internal wall adjacent to the compartment for transferring heat from electronic circuitry mounted to the internal wall and for channeling air through an airflow corridor in conjunction with an opposing portion of a cover of the motor mounted within the motor space or a second internal wall that can then provide for an additional airflow corridor in conjunction with the opposing portion of the cover.

Referring now to the drawings, FIG. 1 shows an embodiment of a motor assembly 10. As shown, the motor assembly 10 can include i) a structural unit 100, ii) a motor 150, and iii) electronic circuitry 180.

In accordance with the embodiment illustrated in FIGS. 2-5, the structural unit 100 can include on one side a compartment 110 defined and at least substantially enclosed by the intersections of an exterior cap 120 and an opposing interior wall 125 intersected by opposing side walls 128, 129 and opposing first and second end walls 131, 132.

In a possible arrangement, the structural unit 100 can be made from any of cast aluminum alloy, brass, bronze, magnesium, or other high strength metals. In some arrangements, the compartment 110 can be structured to be dust-tight, splash proof, or substantially water-resistant. In an embodiment, the compartment 110 can withstand water jets defined as water projected at all angles through a 6.3 mm nozzle at a flow rate of 12.5 liters/min at a pressure of 30 kN/m2 for 3 minutes from a distance of 3 meters in accordance with an IP65 rating under the international standard set forth in IEC 60529, enabling it to house electronic circuitry for use on many types of watercraft. In an arrangement, the structural unit 100 can have minimal porosity within any metal components to avoid cracks that can expose the compartment 110 to the environment. The structural unit 100 can include access holes 135 to allow cables to access any electronic circuitry within the compartment 110, as described further herein. These access holes 135 can be sealed around any cables or wires that pass therethrough, such as by gaskets, grommets, O-rings, caulk, or the like.

Figure 5:
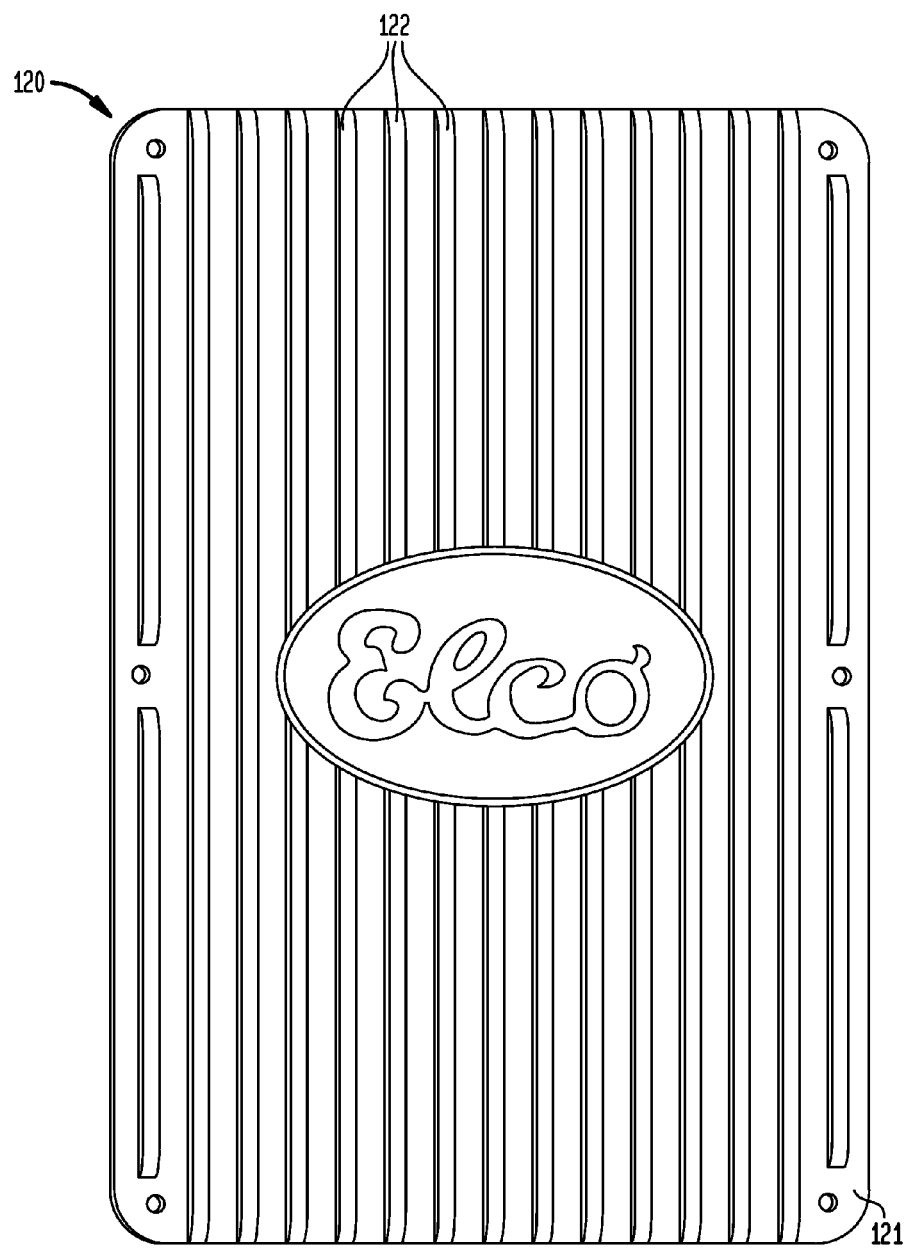
FIG. 5 is a perspective view of an exterior cap of the structural unit shown in FIG. 2.

As shown in greater detail in FIG. 5, the exterior cap 120 can include a plate 121 that is attached to each of the opposing side walls 128, 129 and first and second end walls 131, 132. This attachment can be made through a threaded engagement such as by a screw. The exterior cap 120 can have a series of parallel fins 122 exposed to the ambient environment. In an arrangement, the fins 122 can be thin plates having opposing flat sides and spaced apart an equal distance from one another to optimize a cooling effect by the fins. Due to the increase in surface area using the fins 122 as compared to a flat surface and the equidistant spacing of the fins 122, it is believed that an exterior cap having fins can transfer greater amounts of heat with the ambient environment than a flat surface. The cap 120 will have adequate mechanical strength with a thickness of at least $3/16$ inches. The upper limit of the thickness of the cap 120 can be determined by considerations relating to the weight and cost of materials. In general, increased thickness will not adversely affect the thermal conductivity of the inner cap 120. The cap 120 can be sealed onto structural unit 100 by an O-ring or the like that can be assembled within channel 112 of the structural unit 100, or in a similar channel formed in cap 120. Such an o-ring can be made from rubber, nylon, silicon, TEFLON, neoprene, or the like. The cap 120 can be assembled onto structural unit 100 using, bolts or screws, as discussed above, that are tightened to a predetermined level to provide adequate sealing between the cap 120 and the structural unit 100.

Figure 2:
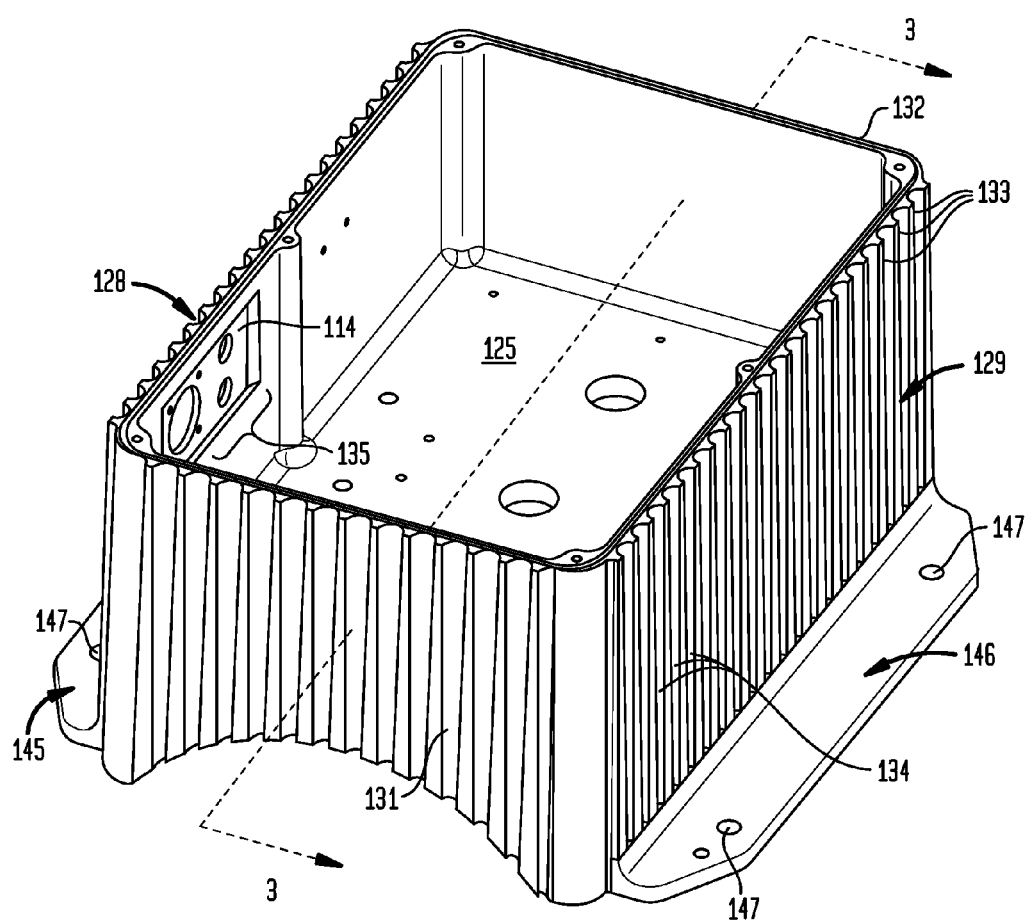
FIG. 2 is a perspective view of a structural unit, shown without an exterior cap, for use with the motor assembly shown in FIG. 1.
Figure 4:
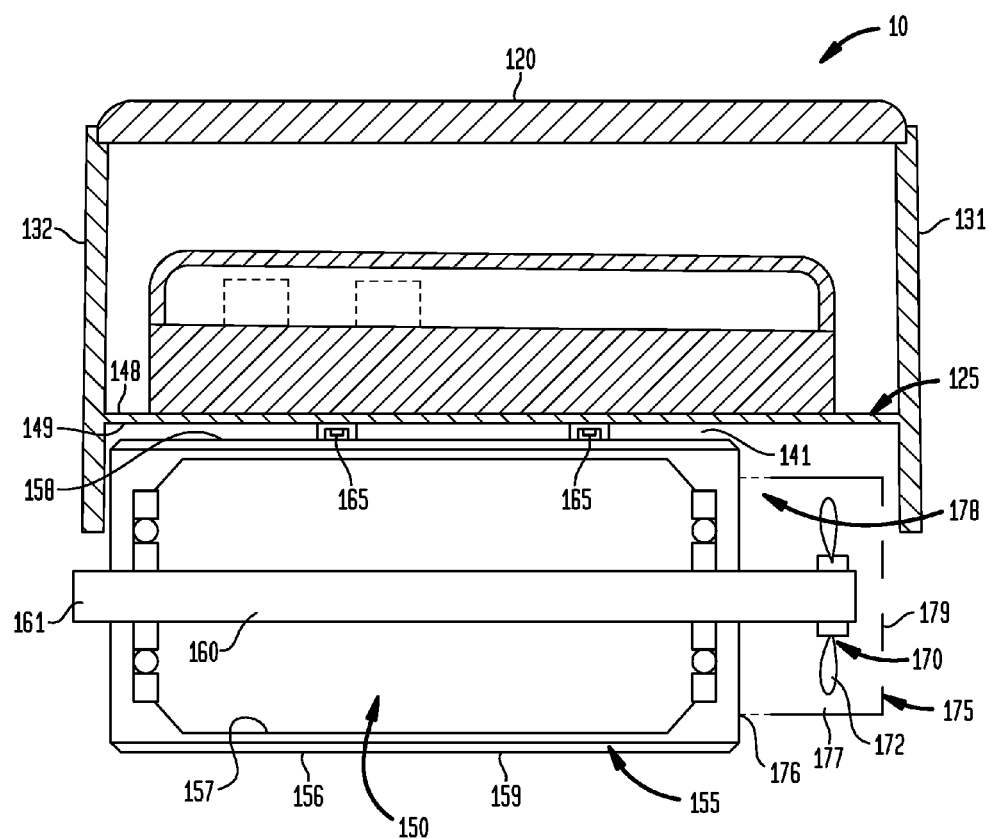
FIG. 4 is a side cross-sectional view of the motor assembly shown in FIG. 1.

The opposing side walls 128, 129 can extend past the interior wall 125 on a side opposite the compartment 110 and, in conjunction with the interior wall 125, define a motor space 140. In a preferred arrangement, the opposing side walls 128, 129 can extend in further conjunction with the first and second end walls 131, 132 to further define the motor space 140. Although the opposing side walls 128, 129 can be flat, in an arrangement, as best seen in FIGS. 2 and 4, these walls 128, 129 can have evenly spaced channels 132 extending in the direction in which the opposing side walls 128, 129 extend from the interior wall 125. In some arrangements, the channels 132 can have a circular or concave shape that aid in conduction and radiation cooling with minimal reduction in surface area. In a further arrangement, the opposing side walls 128, 129 have an outer surface 133 farthest from the interior of the structural unit 100 that forms an outer boundary of the channels 134. In some arrangements, this outer surface can be substantially flat.

Figure 6:
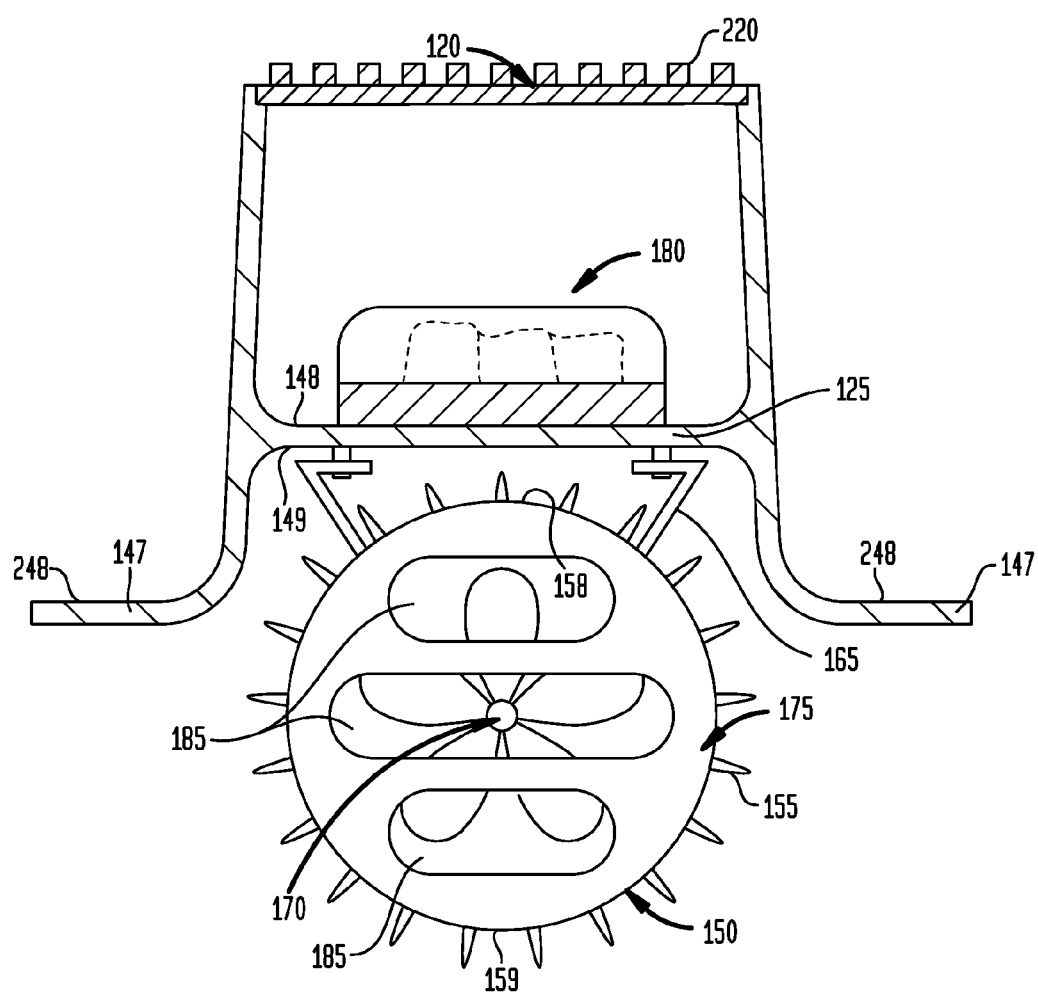
FIG. 6 is a front cross-sectional view of the motor assembly shown in FIG. 1.

Extending from an end of the opposing side walls in a direction away from the center of the structural unit 100 can be a set of flanges 145, 146 on each side of the structural unit 100. In an arrangement as shown in FIG. 6, the flanges 145 project in a direction perpendicular to the side walls 128, 129 and a direction parallel to, and have a top surface 248 at a predetermined distance from, a bottom surface 149 of the interior wall 125. In such an arrangement, the flanges 145, 146 can be located at a height relative to the bottom surface 149 of the interior wall 125 that is 40-60% of the overall height of the motor assembly 10. Alternatively, the top surface 248 of the flanges 145 can be at a predetermined distance from a top surface 2208 of the exterior cap 120 only or in addition to the interior wall 125. The flanges 145, 146 can run the entire length of the respective opposing side walls 128, 129. In other arrangements, more than one flange can extend from the opposing side walls 128, 129. The flanges can have mounting holes 147 for use in mounting the structural unit 100 on an external structure, such as a boat hull. In an alternative arrangement, the flanges 145, 146 can extend toward the center of the structural unit 100. Although such an arrangement can reduce the bending stress on the flanges 145, 146, this arrangement can restrict the available space in the motor space 140.

Figure 3:
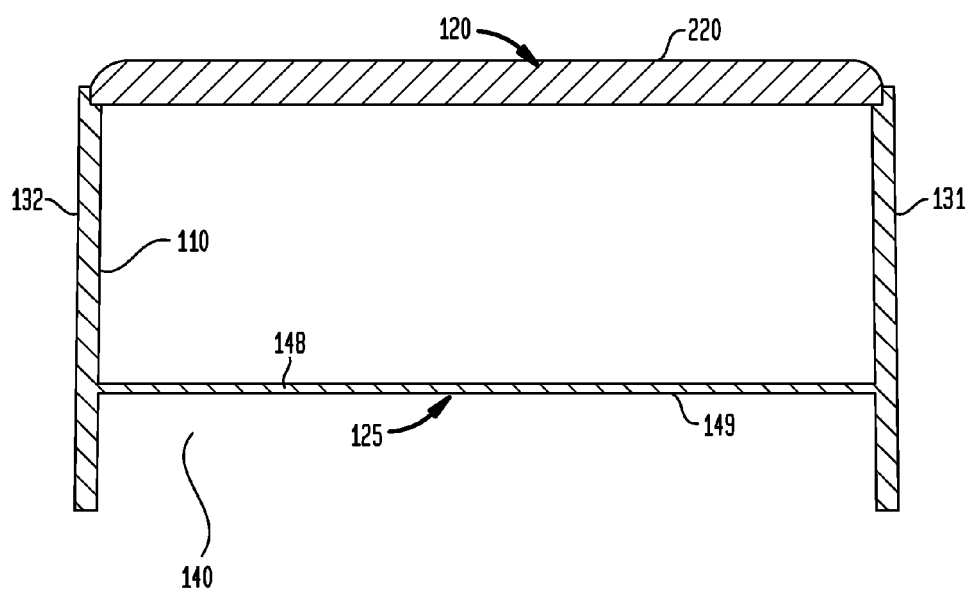
FIG. 3 is a side cross-sectional view of the structural unit shown in FIG. 2.

As best illustrated in FIG. 3, the interior wall 125 can divide the compartment 110 from the motor space 140. The interior wall 125 can include cavities for mounting objects on either side, in particular any electronic circuitry on the top surface 148 and a motor on the bottom surface 149 of the interior wall 125 as described further herein. The bottom surface 149 can be solid to prevent contamination from foreign objects including water and dust particles from entering the compartment. In another embodiment, the wall 125 can include additional access holes 135 to allow for an electrical connection between circuitry 180 and the motor 150. The access holes 135 can be sealed around any cables or wires passing therethrough, as discussed above. The thickness of the interior wall 125 can be chosen based on desired strength, vibrational, and heat transfer characteristics. Such a thickness can be a minimum of $3/8$ inches to achieve adequate combination of thermal conductivity and mechanical strength. In an embodiment, such a thickness can be at least about ½ inch. The thickness of the wall 125 can be limited on the upper end by the weight and cost of materials.

The motor space 140 can be sized to allow a motor of up to a predetermined size to be mounted therein. In application, a number of differently-sized structural units can be made available to accommodate a number of differently sized, or ranges of differently sized motors. In an example two different sizes of structural units 100 and accompanying exterior caps 120 can be provided including a "small" size that can accommodate a motor of between 1 and 10 horsepower and a "large" size that can accommodate a motor of between 20 and 50 horsepower. In the embodiment shown in FIGS. 2-4, the motor space 140 is sized to accommodate the motor 150, which can be an electric motor of any of the types described further herein.

In an embodiment, the motor 150 can be a brushless alternating current (AC) motor having a rotatable rotor but no commutators and utilizing permanent magnets. Alternatively, the motor 150 can be an induction motor having no permanent magnets, which can be beneficial because permanent magnets are often fabricated using rare earth metals. As a further alternative, the motor can be a TEFC motor, as discussed above. In another alternative arrangement, the motor can be a brushless direct current (DC) motor that receives switched direct current to its stator which can use a permanent magnet or DC-supplied rotor, the designs of which are also well-known in the art. Although a brushed direct current (DC) motor can be used, traditionally these motors cannot be ventilated due to the potential for contamination and the high level of noise they often exhibit.

Figure 7:
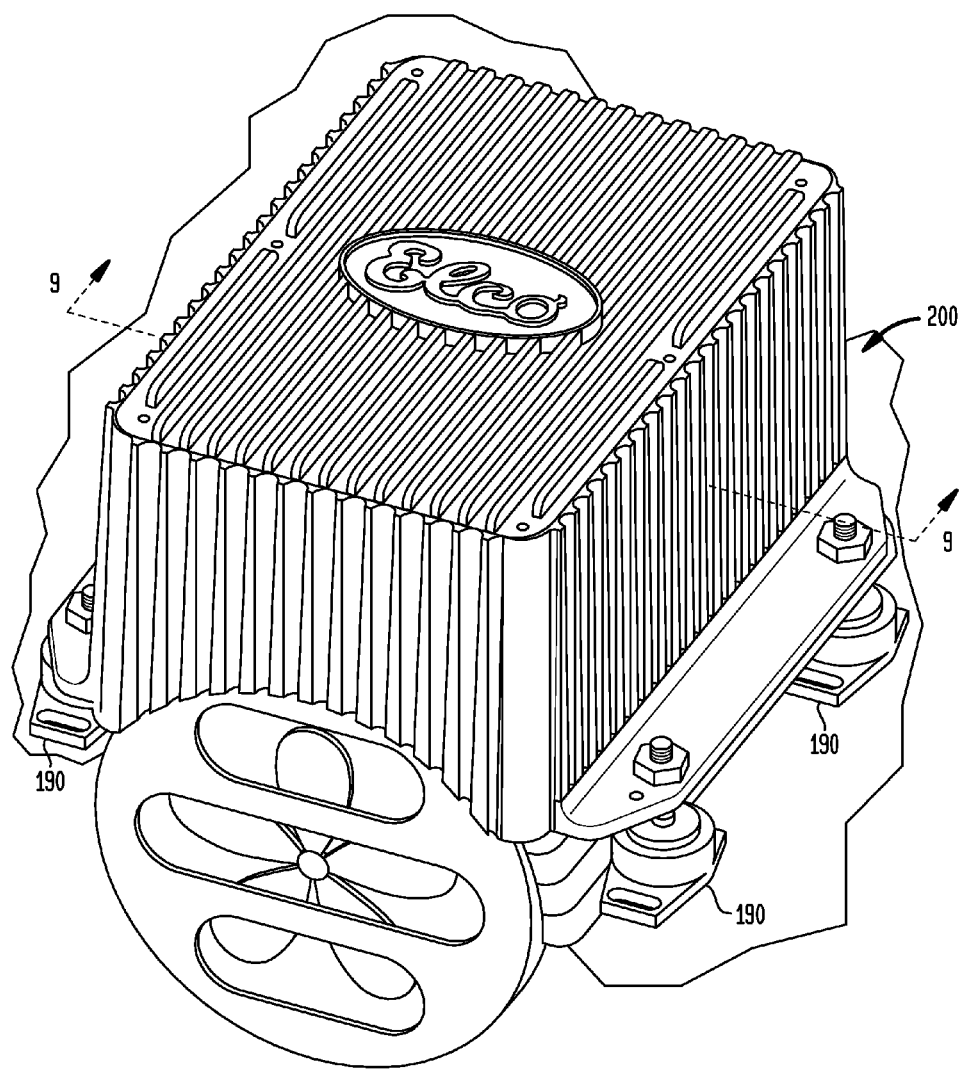
FIG. 7 is a perspective view of the motor assembly shown in FIG. 1 mounted on a preconfigured external mounting configuration.

As shown in FIGS. 4, 6, and 7, the motor 150 can be attached through a bolted connection between a motor cover 155 and the structural unit 100 as part of the motor assembly 10. The motor cover 155 can include a first portion 158 adjacent to the interior wall 125 a second portion 159 opposite the first portion 158. The motor 150 can be an "off-the-shelf" motor having a mounting arrangement provided either on an end plate of the motor surrounding a shaft 160 (seat-faced mounting) or by feet extending away from the motor housing. Such mounting configurations can include holes in the structural unit 100 that match the spatial distribution of holes in a NEMA standard configuration. In the embodiment shown, the motor 150 is a foot-mounted motor, wherein the feet 165 are positioned to contact the wall 125. Holes 126 in the wall 125 are positioned to accept bolts 164 or other fasteners that pass through feet 165. In another arrangement one of the first or second end walls 131, 132 can extend to cover one of the faces 190, 191 of the motor 150 and can include holes to accept bolts in a face-seated mounting arrangement. Such a wall 131, 132 can also include vents to provide for air passageways therethrough. The foot-mounted motor arrangement shown is such that motor is positioned within the motor space 140 at a distance from the inside the wall 125. As shown, this spaced-apart arrangement between the motor 150 and inside the wall 125 defines a corridor 141 that is open over both the front and back faces 190, 191 of the motor 150 and can be further bounded at sides thereof by the side walls 128, 129. In a seat-faced mounting arrangement, the mounting holes 126 of the structural unit 100 can be positioned such that motor 150 is spaced apart from interior wall 125 at a distance to form such a corridor.

Figure 9:
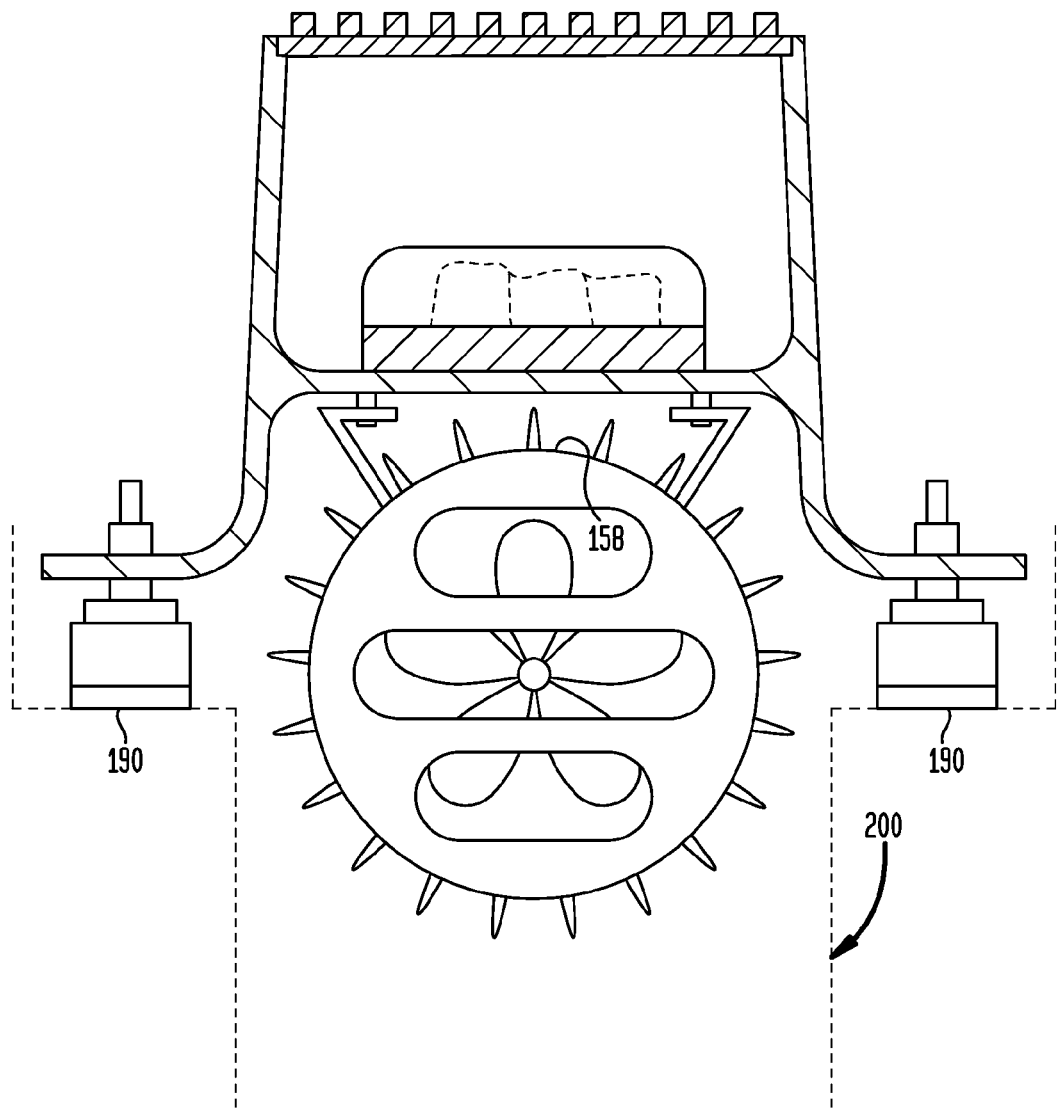
FIG. 9 is a front cross-sectional view of the mounted motor assembly shown in FIG. 7.

As shown in FIGS. 7 and 9, a fan 170 having blades 172 is mounted adjacent to the motor cover 155. Although the fan 170 can utilize a separate electrical power system, in a preferred arrangement, the motor 150 is affixed onto a shaft 160 of the motor 150 that can be the axle of the motor armature or other rotating structure. The shaft can further be common with the power take-off of the motor 161 and disposed on an opposite side of the housing 156. In this attached configuration, the fan 170 can be attached through a bolt or screw connection or can be a press-fit with shaft 159. In some arrangements, the fan 170 can be an axial fan having curved blades that direct air in only one direction parallel to the shaft 160. Alternatively, the fan 170 can be a radial fan having flat blades that directs air circumferentially away from the shaft 160 of the motor 150, regardless of the direction of motor rotation. Due to the engagement of the motor shaft 160 and the fan 170, the radial fan rotates at the same speed as the motor 150 and thus rotates at a faster rate as the motor speed increases. In this manner, the fan 170 provides a greater velocity of air as the motor speed increases, which results in greater cooling at times when the motor is producing greater heat.

A fan shroud 175 surrounds the fan 170 and has a first end 176 that attaches to the motor cover 155. In an arrangement, the fan shroud 175 can form a monolithic structure with the motor cover 155. Alternatively, the fan shroud 175 can be a separate element attached on the motor cover 155. In either the single component or multi-component arrangements, the fan shroud 175 and the motor cover 155 define a fan space 177. On a second end opposite the motor 150 and motor cover 155, the fan shroud 175 can have slots 185 to permit the free flow of air into the fan space 177.

An further opening or a plurality of openings 178 are provided between the fan blades 172 and the motor cover 155. In this embodiment, the openings place the fan space 177 in fluid communication with the corridor 141 between the interior wall 125 and the first portion 158 of the motor cover 155, and optionally also to the second portion 159 of the motor cover 155 opposite the first portion 158. In this manner, the rotational movement of the fan 170 as the shaft 159 of the motor 150 turns to provide forced ambient air across the motor cover 155 and the interior wall 125 though the corridor 141. In accordance with the present invention, this forced air acts to cool the motor 150 and the interior wall 125. The cooling of the interior wall 125 can provide cooling of the electronic circuitry 180 because the interior wall 125 acts as a heat-sink, absorbing heat from the electronic circuitry 180. The cooling of the wall 125 increases the heat-absorption capacity of the interior wall 125, thereby increasing the cooling of the electronic circuitry. In other words, the interior wall 125 conducts heat away from the electronic circuitry 180 (which is in contact therewith), and the heat is then carried away from the interior wall 125 by the forced ambient air passing through the corridor 141 and in contact with the wall 125. Additional heat absorbed from the electronic circuitry 180 by the wall 125 can also be dispersed among the remaining portions of structural unit 100 for transfer into the ambient air therearound. A fan 170 directing air circumferentially can be preferred as the air will be directed outwardly regardless of the direction of rotation of the motor shaft 160. In contrast, an axial fan can direct air in only one direction. Thus, for instance, an axial fan can not direct cool air when a marine vessel is in reverse.

Brushless DC or AC motors both require circuitry such as the electronic circuitry 180, shown in a generic form, to control the amplitude and frequency of the current supplied to the motor 150 in order for it to function. This circuitry often has safety equipment such as fuses, thermal cutoffs, or disconnects as well as wiring and terminal strips to route current to various microelectronic devices. In addition, the electrical power from a power source, e.g., batteries, solar panels, generator, etc., for the motor can be DC power requiring an AC/DC inverter to convert the DC signal into an AC signal. Connection of the inverter or other electronic circuitry to the command post (not shown), as discussed above, can allow user control of the amplitude and frequency of power provided to the motor 150. The compartment 110 is sized to accommodate and cool the electronic circuitry and/or inverter, as previously described herein.

The electronic circuitry 180 can receive power by way of a cable connection from a combination of a battery and generator or from a generator alone. The generator can use fuels such as conventional gasoline, diesel fuel, or propane. Referring again to FIG. 1, the access hole 135 of the compartment 110 allows for cable connections between the power source and the motor control circuitry, the command post and the electronic circuitry, and the motor and the electronic circuitry. As discussed previously herein, the access hole 135 can be sealed, making the compartment 110 water-resistant. In an embodiment, the access hole 135 can be a hole sealed by a gasket, such as a TEFLON o-ring, or by a chemical sealant such as silicone. Further sealed openings can be used for other cables or wires between the power source, the command post, and the motor 150. In another embodiment, a connector as part of a wiring harness (not shown) can be received in a cavity 114 to which any cables associated with circuitry 180 can connect. The wiring harness can be sealed within cavity 114 such as by a gasket or the like and can provide outlets or plugs on the exterior of structural unit 100 for connection with wiring within the watercraft or other vehicle in which assembly 10 is used.

Figure 8:
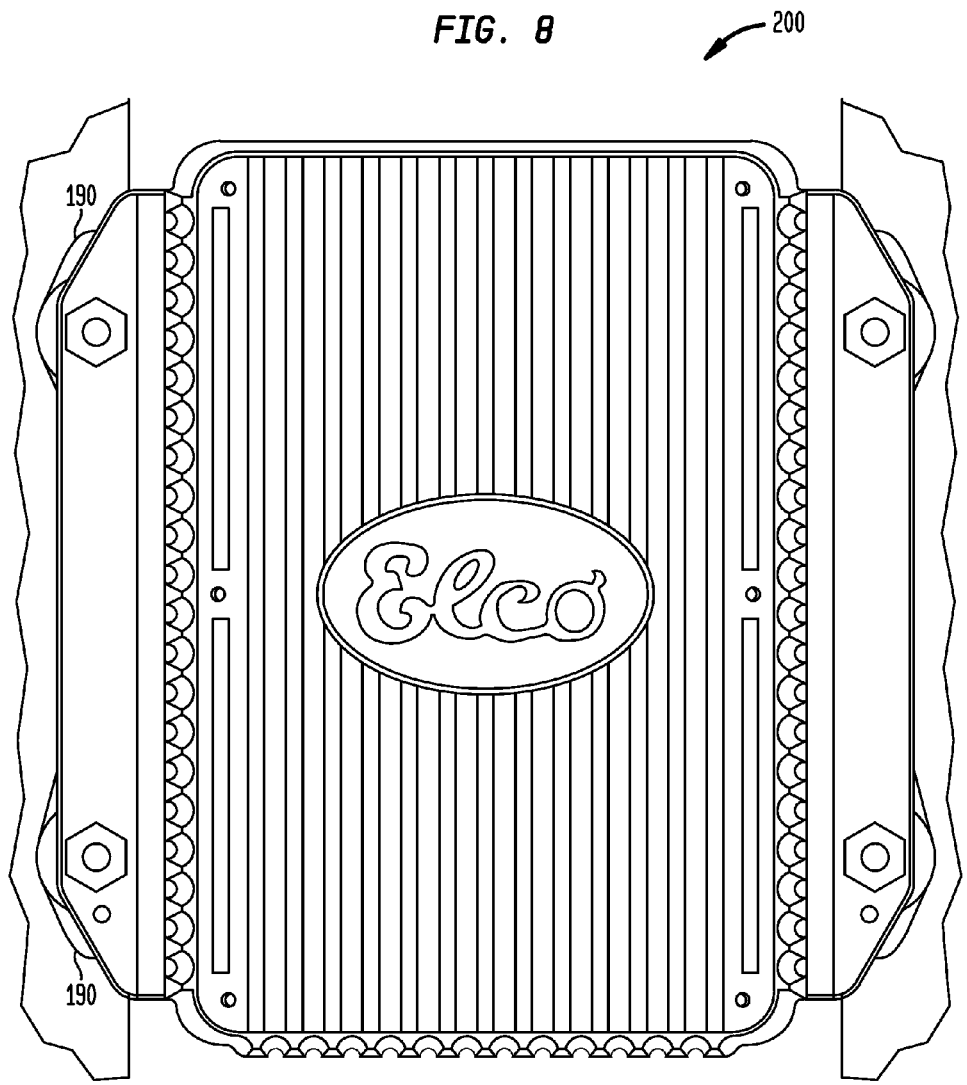
FIG. 8 is a top view of the mounted motor assembly shown in FIG. 7.

As further illustrated in FIGS. 7-9, the motor assembly 10 can be mounted onto a preconfigured external mounting structure 200, shown in exemplary form in the figures as stringers on a boat hull. The distance between the respective centers of the mounting holes 147 in the directions both parallel and perpendicular to the shaft 160 of the motor 150 are set at the same distance as that for many diesel engines. Mounts 190 can be attached to the flanges 145, 146 of the structural unit 100 at the mounting holes 147. In another arrangement, the mounts 190 can also be integrated with the flanges 145, 146. The distances between the respective centers of the mounts 190 can be the same that between the mounting holes 147. These distances can be those used on combustion engines for marine applications of major manufacturers or mass purchasers of combustion engines, such as Yanmar or VOLVO. The distance in the direction parallel to the shaft 160 can be that of typical stringer spacings. In an example, this distance is between about 14 inches and about 26 inches.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A motor assembly comprising:
a motor;
motor control circuitry; and
a structural unit including a compartment defined on a side thereof by an interior wall, the motor control circuitry being received in the compartment and the compartment being configured to enclose and seal the motor control circuitry therein, the structural unit further including opposing side walls, the opposing side walls and the interior wall defining a motor space adjacent to the interior wall and opposite from the compartment, the opposing side walls extending over the length of the motor, wherein the motor space at least partially receives the motor therein.

2. The motor assembly of claim 1, wherein the motor includes an outside surface and a driveshaft, the driveshaft configured to be rotationally driven by the motor, and wherein a portion of the outside surface and at least the interior wall of the structural unit define an airflow corridor with the motor, the motor assembly further comprising a fan attached to the driveshaft of the motor, the fan being configured to produce an airflow by the rotation of the driveshaft such that at least a portion of the airflow passes through the airflow corridor.

3. The motor assembly of claim 2, wherein the motor further includes a fan shroud portion having a wall that, with the outside surface of the motor, defines a fan space, wherein the fan is a radial fan rotatable within the fan space, and wherein the fan shroud portion is configured to direct the airflow produced by the fan toward the airflow corridor.

4. The motor assembly of claim 2, wherein the fan is an axial fan oriented within the motor space such that the airflow is further produced by the axial fan in a direction toward the airflow corridor.

5. The motor assembly of claim 2, wherein the airflow corridor includes a first end and a second end, the first end being adjacent the fan and configured to receive the airflow of the fan, and the second end being opposite the first end relative to the motor and configured to provide an outlet for the airflow.

6. The motor assembly of claim 2, wherein the outside surface of the motor has a first portion and a second portion, the first portion of the motor being received in the motor space and the second portion being outside the motor space, and wherein the fan is further configured to direct a portion of the airflow over the outside surface of the motor within the first portion.

7. The motor assembly of claim 1, wherein the motor is an electric motor and the motor control circuitry is in electrical communication with the motor.

8. The motor assembly of claim 7, wherein the motor is a totally enclosed motor.

9. The motor assembly of claim 1, wherein the compartment is sealed such that the compartment is at least water-resistant.

10. The motor assembly of claim 1, wherein the motor control circuitry is enclosed in a circuitry housing, the circuitry housing being received in at least partial contact with the interior wall of the compartment.

11. The motor assembly of claim 1, wherein the structural unit is configured for dissipating heat at least from within the compartment into an ambient environment.

12. The motor assembly of claim 11, wherein the ambient environment includes an airflow corridor defined between the interior wall of the structural unit and a portion of the motor.

13. The motor assembly of claim 1, wherein the interior wall is flat along a surface exposed to the motor space.

14. The motor assembly of claim 1, wherein the structural unit has first and second opposing end walls perpendicular to the side walls and defining the motor space with the interior wall and the side walls, wherein the motor is contained between the first and second opposing end walls, and wherein the motor is affixed to the interior wall.

15. The motor assembly of claim 14, wherein the motor includes a driveshaft configured to be rotationally driven by the motor and having an end configured for attachment with an external structure, and wherein the first end wall includes an opening through which the driveshaft projects such that the end is positioned outside of the motor space.

16. The motor assembly of claim 15, wherein the motor assembly further includes at least two motor mounts affixed to respective flanges through holes thereof, and wherein the holes are configured such that the motor mounts match a mounting configuration of a standard combustion engine.

17. The motor assembly of claim 15, wherein the structural unit includes at least one flange having two holes therethrough, and wherein respective centers of the holes define a width between 6 and 18 inches therebetween, and wherein each of the two holes is at least one inch from a respective end of the flange.

18. The motor assembly of claim 1, the structural unit further including at least two flanges extending from the opposing side walls, the at least two flanges being configured for mounting the motor assembly to a preconfigured external mounting structure.

19. The motor assembly of claim 18, wherein at least some of the at least two flanges have at least one hole therethrough, wherein the preconfigured external mounting structure has a mounting configuration for a standard diesel engine and wherein the holes are configured to match the preconfigured external mounting structure.

20. The motor assembly of claim 18, wherein the structural unit defines a top of the assembly, the motor defines a bottom of the assembly, and a height of the assembly is defined by a distance between the top and bottom, and wherein the flanges are positioned at a distance from the bottom of the assembly equal to between 30% and 60% of the height of the assembly.

21. A structural unit for an electric motor assembly comprising:
   a compartment defined on a side thereof by an interior wall and being configured to enclose and seal motor control circuitry therein;
   opposing side walls, the opposing side walls and the interior wall defining a motor space adjacent the interior wall and opposite from the compartment, the motor space being configured to at least partially receive an electric motor therein; and
   at least two flanges extending from the opposing side walls on a side opposite the compartment, the at least two flanges being configured to match a preconfigured external mounting structure.

22. The structural unit of claim 21, wherein the preconfigured external mounting structure has a mounting configuration for a standard combustion engine.

23. The structural unit of claim 21, further comprising a first end wall perpendicular to the side walls and defining the motor space with the interior wall and the side walls, wherein the first end wall is configured for mounting a motor thereto, and wherein the first end wall includes an opening configured for a motor driveshaft to extend therethrough.

24. The structural unit of claim 23, wherein the structural unit is a monolithic structure.

25. The structural unit of claim 23, wherein the structural unit is further configured to position a motor within the motor space such that at least the interior wall of the structural unit defines an airflow corridor with a portion of an outside surface of the motor and such that a fan mounted on a driveshaft of the motor and producing an airflow by rotational motion caused by the motor directs a portion of the airflow through the airflow corridor.

26. A motor assembly comprising:
   a motor;
   motor control circuitry; and
   a structural unit including a compartment defined on a side thereof by an interior wall, the motor control circuitry being received in the compartment and the compartment being configured to enclose and seal the motor control circuitry therein, the structural unit further including opposing side walls, the opposing side walls and the interior wall defining a motor space adjacent to the interior wall and opposite from the compartment, wherein the structural unit has first and second end walls perpendicular to the side walls and the motor is contained between the end walls, and wherein the motor space at least partially receives the motor therein.

* * * * *